(12) United States Patent
Alfano

(10) Patent No.: US 11,965,663 B2
(45) Date of Patent: Apr. 23, 2024

(54) REFRIGERANT LEAK SENSOR WITH EXTENDED LIFE

(71) Applicant: Copeland LP, Sidney, OH (US)

(72) Inventor: David A. Alfano, Dayton, OH (US)

(73) Assignee: Copeland LP, Sidney, OH (US)

( * ) Notice: Subject to any disclaimer, the term of this patent is extended or adjusted under 35 U.S.C. 154(b) by 379 days.

(21) Appl. No.: 17/306,337

(22) Filed: May 3, 2021

(65) Prior Publication Data

US 2022/0349600 A1  Nov. 3, 2022

(51) Int. Cl.
| F24F 11/36 | (2018.01) |
| F24F 11/49 | (2018.01) |
| F24F 110/65 | (2018.01) |
| F24F 140/00 | (2018.01) |
| G01M 3/18 | (2006.01) |

(52) U.S. Cl.
CPC .............. *F24F 11/36* (2018.01); *F24F 11/49* (2018.01); *G01M 3/182* (2013.01); *G01M 3/183* (2013.01); *G01M 3/188* (2013.01); *F24F 2110/65* (2018.01); *F24F 2140/00* (2018.01)

(58) Field of Classification Search
CPC ...... G01M 3/182; G01M 3/183; G01M 3/188; F24F 11/36; F24F 11/49; F24F 2140/00; F24F 2110/65
See application file for complete search history.

(56) References Cited

U.S. PATENT DOCUMENTS

| 7,577,470 | B2 | 8/2009 | Shah et al. |
| 7,948,015 | B2 | 5/2011 | Rothberg et al. |
| 8,523,773 | B2 | 9/2013 | Shah et al. |
| 9,958,414 | B2 | 5/2018 | Rothberg et al. |
| 2006/0004272 | A1 | 1/2006 | Shah et al. |
| 2015/0011852 | A1 | 1/2015 | Van Kesteren et al. |
| 2018/0187917 | A1 | 7/2018 | Suzuki et al. |
| 2019/0242642 | A1 | 8/2019 | Shapiro et al. |
| 2021/0041386 | A1* | 2/2021 | Toyota .................. G01N 27/12 |
| 2022/0128267 | A1* | 4/2022 | Tsuji ..................... F24F 1/0063 |
| 2023/0204556 | A1* | 6/2023 | Batista ............... G01N 33/0036 340/632 |

FOREIGN PATENT DOCUMENTS

| JP | 2018162912 A | 10/2018 |
| KR | 20160061208 A | 5/2016 |

OTHER PUBLICATIONS

International Search Report and Written Opinion for application No. PCT/US2022/027301 dated Aug. 16, 2022.

\* cited by examiner

*Primary Examiner* — Paul M. West
(74) *Attorney, Agent, or Firm* — Harness, Dickey & Pierce, P.L.C.

(57) ABSTRACT

A refrigerant leak sensor includes: a first refrigerant sensor element configured to, when powered: measure a first amount of the refrigerant present in air; and generate a first output based on the first amount; a second refrigerant sensor element configured to, when powered: measure a second amount of the refrigerant present in air; and generate a second output based on the second amount; a first selection module configured to: during a first period, apply power the first refrigerant sensor element and not apply power to the second refrigerant sensor element; and during a second period after the first period, apply power to the second refrigerant sensor element and not apply power to the first refrigerant sensor element.

20 Claims, 7 Drawing Sheets

REFRIGERANT LEAK SENSOR WITH EXTENDED LIFE

FIELD

The present disclosure relates to refrigerant leak sensors and more particularly to systems and methods for controlling measurements of refrigerant leak sensors.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Refrigeration and air conditioning applications are under increased regulatory pressure to reduce the global warming potential of the refrigerants they use. In order to use lower global warming potential refrigerants, the flammability of the refrigerants may increase.

Several refrigerants have been developed that are considered low global warming potential options, and they have an ASHRAE (American Society of Heating, Refrigerating and Air-Conditioning Engineers) classification as A2L, meaning mildly flammable. The UL (Underwriters Laboratory) 60335-2-40 standard, and similar standards, specifies a predetermined (M1) level for A2L (or mildly flammable) refrigerants and indicates that A2L refrigerant charge levels below the predetermined level do not require leak detection and mitigation.

SUMMARY

In a feature, a refrigerant leak sensor includes: a first refrigerant sensor element configured to, when powered: measure a first amount of the refrigerant present in air; and generate a first output based on the first amount; a second refrigerant sensor element configured to, when powered: measure a second amount of the refrigerant present in air; and generate a second output based on the second amount; a first selection module configured to: during a first period, apply power the first refrigerant sensor element and not apply power to the second refrigerant sensor element; and during a second period after the first period, apply power to the second refrigerant sensor element and not apply power to the first refrigerant sensor element; and a second selection module configured to: during the first period, connect the first output of the first refrigerant sensor element to a third output and not connect the second output of the second refrigerant sensor element to the third output; and during the second period, connect the second output of the second refrigerant sensor element to the third output and not connect the first output of the first refrigerant sensor element to the third output.

In further features, a leak module is configured to indicate whether a refrigerant leak is present based on the third output.

In further features, the second refrigerant sensor element is covered with an air impermeable film prior to being powered.

In further features, the second refrigerant sensor includes an opener configured to open at least a portion of the film covering an opening of the second refrigerant sensor.

In further features, the opener is a heat source.

In further features, the heat source generates heat and ruptures the film when power is applied to the second refrigerant sensor element.

In further features, the opener is a light source.

In further features, the light source is configured to output light onto the film and rupture the film when power is applied to the second refrigerant sensor element.

In further features, the light source is configured to output one of infrared (IR) and ultraviolet (UV) light onto the film.

In further features, the film includes one of a polyvinyl chloride film, a low density polyethelene film, an ethylene vinyl acetate copolymer film, a polyactic acid film, a polyhydroxyburyrate film, and a poly(3-hydroxybutyrate-co-3-hydroxyvalerate) film.

In further features, a thickness of the film is less than or equal to 30 micrometers.

In further features, a third refrigerant sensor element is configured to, when powered: measure a third amount of the refrigerant present in air; and generate a fourth output based on the third amount, where the first selection module is further configured to, during a third period after the second period, apply power to the third refrigerant sensor element and not apply power to the first and second refrigerant sensor elements, and where the second selection module is configured to, during the third period, connect the fourth output of the third refrigerant sensor element to the third output and not connect the first and second outputs of the first and second refrigerant sensor elements to the third output.

In further features: an end of life module is configured to indicate when an end of life event of the first refrigerant sensor element has occurred; and a selection control module configured to end the first period and begin the second period in response to the indication that the end of life event of the first refrigerant sensor element has occurred.

In further features, the end of life module is configured to indicate that the end of life event of the first refrigerant sensor element has occurred when the first refrigerant sensor element has been powered for a predetermined period.

In further features, the end of life module is configured to indicate that the end of life event of the first refrigerant sensor element has occurred when a change in the first output over time is greater than a predetermined period.

In further features, the end of life module is configured to indicate that the end of life event of the first refrigerant sensor element has occurred when a change in the first output in response to a change in an operating parameter is less than a predetermined period.

In further features, the refrigerant leak sensor is located within a duct of a heating ventilation and air conditioning (HVAC) system of a building.

In further features, the refrigerant is classified as at least mildly flammable.

In further features, the first and second refrigerant sensor elements are one of: non-dispersive infrared (NDIR) refrigerant sensors; optical refrigerant sensors;
thermal conductivity refrigerant sensors; quartz crystal microbalance (QCM) refrigerant sensors; electrochemical refrigerant sensors; catalytic bead refrigerant sensors; and metal oxide refrigerant sensors.

In a feature, a method of sensing refrigerant leaks includes: by a first refrigerant sensor element, when powered: measuring a first amount of the refrigerant present in air; and generating a first output based on the first amount; by a second refrigerant sensor element, when powered: measuring a second amount of the refrigerant present in air; and generating a second output based on the second amount; during a first period, applying power the first refrigerant sensor element and not applying power to the second refrigerant sensor element; during a second period after the first period, applying power to the second refrigerant sensor element and not applying power to the first refrigerant sensor element; during the first period, connecting the first output of the first refrigerant sensor element to a third output and not connecting the second output of the second refrigerant sensor element to the third output; and during the second period, connecting the second output of the second refrigerant sensor element to the third output and not connecting the first output of the first refrigerant sensor element to the third output.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Some refrigerants used in refrigeration systems may be classified as mildly flammable (e.g., A2L refrigerants). Refrigeration systems using mildly flammable refrigerant may include a refrigerant leak sensor configured to measure an amount of refrigerant that is present in air outside of the refrigerant containing portion of the refrigeration system within a building served by the refrigeration system. This amount of refrigerant corresponds to an amount of refrigerant that has leaked out of the refrigeration system. The useful life of some types of refrigerant leak sensors, however, may be relatively short.

The present application involves a refrigerant leak sensor that includes multiple refrigerant sensor elements that are used individually. For example, a first refrigerant sensor element may initially be powered and used to measure the amount of refrigerant. While the first refrigerant sensor element is being used, a second refrigerant sensor element may be disconnected from power and not used. When the first refrigerant sensor element reaches an end of its useful life, the second refrigerant sensor element may be powered and used to measure the amount of refrigerant.

The inclusion of multiple refrigerant sensor elements increases the useful life of the refrigerant leak sensor. Also, less costly refrigerant sensor elements (e.g., metal oxide refrigerant sensors) can be implemented while providing the refrigerant leak sensor with a longer overall useful life.

Figure 1:
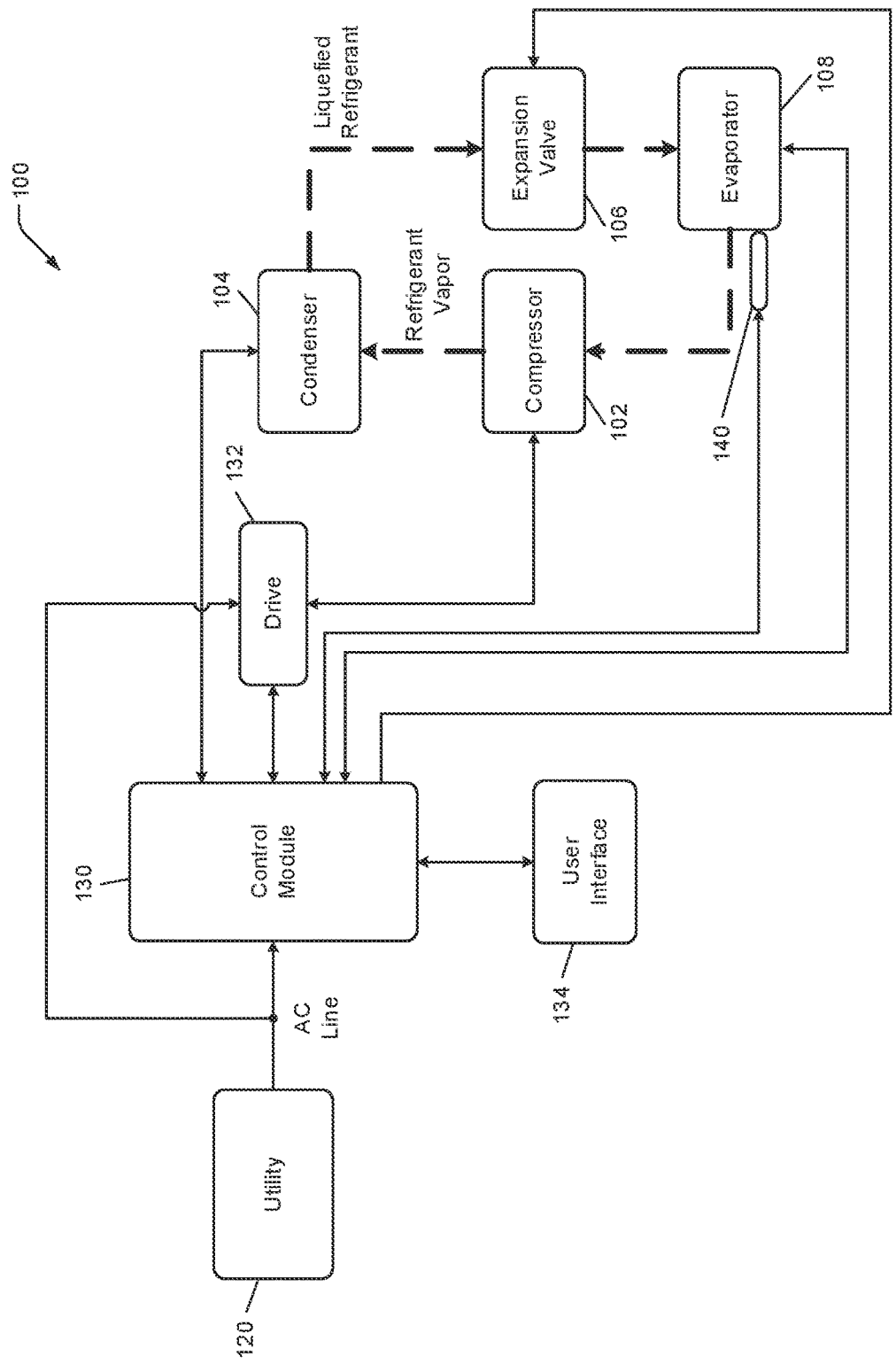
FIG. 1 is a functional block diagram of an example refrigeration system.

FIG. 1 is a functional block diagram of an example refrigeration system 100 including a compressor 102, a condenser 104, an expansion valve 106, and an evaporator 108. The refrigeration system 100 may include additional and/or alternative components, such as a reversing valve or a filter-drier. In addition, the present disclosure is applicable to other types of refrigeration systems including, but not limited to, heating, ventilating, and air conditioning (HVAC), heat pump, refrigeration, and chiller systems. For example, the refrigeration system 100 may include a reversing valve (not shown) that is configured to reverse a direction of refrigerant flow in a heat pump system.

The compressor 102 receives refrigerant in vapor form and compresses the refrigerant. The compressor 102 provides pressurized refrigerant in vapor form to the condenser 104. The compressor 102 includes an electric motor that drives a pump. For example only, the pump of the compressor 102 may include a scroll compressor and/or a reciprocating compressor.

All or a portion of the pressurized refrigerant is converted into liquid form within the condenser 104. The condenser 104 transfers heat away from the refrigerant, thereby cooling the refrigerant. When the refrigerant vapor is cooled to a temperature that is less than a saturation temperature, the refrigerant transforms into a liquid (or liquefied) refrigerant. The condenser 104 may include an electric fan that increases the rate of heat transfer away from the refrigerant.

The condenser 104 provides the refrigerant to the evaporator 108 via the expansion valve 106. The expansion valve 106 controls the flow rate at which the refrigerant is supplied to the evaporator 108. The expansion valve 106 may include a thermostatic expansion valve or may be controlled electronically by, for example, a control module 130. A pressure drop caused by the expansion valve 106 may cause a portion of the liquefied refrigerant to transform back into the vapor form. In this manner, the evaporator 108 may receive a mixture of refrigerant vapor and liquefied refrigerant.

The refrigerant absorbs heat in the evaporator 108. Liquid refrigerant transitions into vapor form when warmed to a temperature that is greater than the saturation temperature of the refrigerant. The evaporator 108 may include an electric fan that increases the rate of heat transfer to the refrigerant.

A utility 120 provides power to the refrigeration system 100. For example only, the utility 120 may provide single-phase alternating current (AC) power at approximately 230 Volts root mean squared ($V_{RMS}$). In other implementations, the utility 120 may provide three-phase AC power at approximately 400 $V_{RMS}$, 480 $V_{RMS}$, or 600 $V_{RMS}$ at a line frequency of, for example, 50 or 60 Hz. When the three-phase AC power is nominally 600 $V_{RMS}$, the actual available voltage of the power may be 575 $V_{RMS}$.

The utility 120 may provide the AC power to the control module 130 via an AC line, which includes two or more conductors. The AC power may also be provided to a drive 132 via the AC line. The control module 130 controls the refrigeration system 100. For example only, the control module 130 may control the refrigeration system 100 based on user inputs and/or parameters measured by various sensors (not shown). The sensors may include pressure sensors, temperature sensors, current sensors, voltage sensors, etc. The sensors may also include feedback information from the drive control, such as motor currents or torque, over a serial data bus or other suitable data buses.

A user interface 134 provides user inputs to the control module 130. The user interface 134 may additionally or alternatively provide the user inputs directly to the drive 132. The user inputs may include, for example, a desired temperature, requests regarding operation of a fan (e.g., a request for continuous operation of the evaporator fan), and/or other suitable inputs. The user interface 134 may take the form of a thermostat, and some or all functions of the control module (including, for example, actuating a heat source) may be incorporated into the thermostat.

The control module 130 may control operation of the fan of the condenser 104, the fan of the evaporator 108, and the expansion valve 106. The control module 130 may also control actuation of the reversing valve.

The drive 132 may control the compressor 102 based on commands from the control module 130. For example only, the control module 130 may instruct the drive 132 to operate the motor of the compressor 102 at a certain speed or to operate the compressor 102 at a certain capacity. In various implementations, the drive 132 may also control the condenser fan.

The evaporator 108 may be located within a building served by the refrigeration system. The condenser 104 may be located outside of the building. In heat pump systems, the functions of the evaporator 108 and the condenser 104 are switched depending on whether heating is to be performed within the building or cooling is to be performed within the building. When cooling is performed, the condenser 104 and the evaporator 108 perform as described above. When heating is performed, coolant flow is reversed, and the condenser 104 and the evaporator 108 operate oppositely. The condenser 104 and the evaporator 108 may therefore be more generally referred to as heat exchangers.

A refrigerant leak sensor 140 is disposed inside of the building and measures an amount (e.g., concentration) of refrigerant in air (outside of the refrigeration system) present at the refrigerant leak sensor. The refrigerant leak sensor 140 may be located, for example, near the evaporator 108, such as downstream of a blower that blows air across the evaporator 108 and into the building through ducts. The refrigerant leak sensor 140 may also be located downstream of evaporator 108. While the example of the refrigerant sensor 140 being disposed within a duct is provided, the present application is also applicable to the refrigerant leak sensor 140 being within a refrigerated case, an enclosed space, or in proximity to refrigeration system equipment in a room or enclosure.

The refrigerant leak sensor 140 generates a signal based on the amount of refrigerant measured. For example, the refrigerant leak sensor 140 may transmit the amount of refrigerant to the control module 130. Alternatively, the refrigerant leak sensor 140 may set the signal to a first state when the amount is greater than a predetermined amount and set the signal to a second state when the amount is less than the predetermined amount. The predetermined amount may be, for example, 25 percent of a lower flammability level of the refrigerant or another suitable value. In various implementations, the refrigerant is classified under one or more standards as being mildly flammable. For example only, the refrigerant may be classified as an A2L refrigerant or more generally mildly flammable as discussed above. The classification may be, for example, by a standard of ASHRAE (American Society of Heating, Refrigerating and Air-Conditioning Engineers), UL (Underwriters Laboratory) 60335-2-40 standard, or in another standard which may be by ASHRAE, UL, or another regulatory body.

The control module 130 receives the output of the refrigerant leak sensor 140 and determines whether a refrigerant leak is present based on the output. For example, the control module 130 may determine that a leak is present when the output is in the first state or when the amount is greater than the predetermined amount. If the amount is less than the predetermined amount or the output is in the second state, the control module 130 may determine that no leak is present.

One or more remedial actions may be taken when a refrigerant leak is present (e.g., the signal indicates that the amount is greater than the predetermined value or the signal is in the first state). For example, the control module 130 may turn on the blower (that blows air across the evaporator 108) when a leak is present. Turning on the blower may disperse leaked refrigerant. Additionally, the control module 130 may turn off the compressor 102 and maintain the compressor 102 off until the leak is remediated (e.g., for a predetermined period). Additionally, the control module 130 may actuate one or more lockout devices to prevent ignition by one or more ignition devices within the building.

Additionally or alternatively, the control module 130 may close one or more isolation valves to isolate the refrigerant outside of the building. In various implementations, a first isolation valve may be implemented directly between the condenser 104 and the expansion valve 106. The control module 130 may close the first isolation valve when a leak is detected. A second isolation valve may be implemented directly between the evaporator 108 and the compressor 102. The control module 130 may maintain the second isolation valve open while the compressor 102 is on and the first isolation valve is closed to pump refrigerant out from within the building. The control module 130 may close the second isolation valve after operation of the compressor 102 for a predetermined period with the first isolation valve closed.

Additionally or alternatively, the control module 130 may generate one or more indicators when a leak is present. For example, the control module 130 may transmit an indicator to one or more external devices, generate one or more visual indicators (e.g., turn on one or more lights, display information on one or more displays, etc.), and/or generate one or more audible indicators, such as via one or more speakers.

The amount of refrigerant measured by the refrigerant leak sensor 140 may naturally deviate from the actual amount of refrigerant present over time. For example, the amount of refrigerant measured may drift over time. One or more ambient conditions (e.g., temperature, pressure, humidity) may cause inaccuracy in the amount of refrigerant measured by the refrigerant leak sensor 140. The blower being on may also cause the amount of refrigerant measured to be inaccurate. The response of the refrigerant leak sensor 140 to change in one or more ambient conditions (e.g., temperature, pressure, humidity) may also slow or speed up over time.

Figure 2:
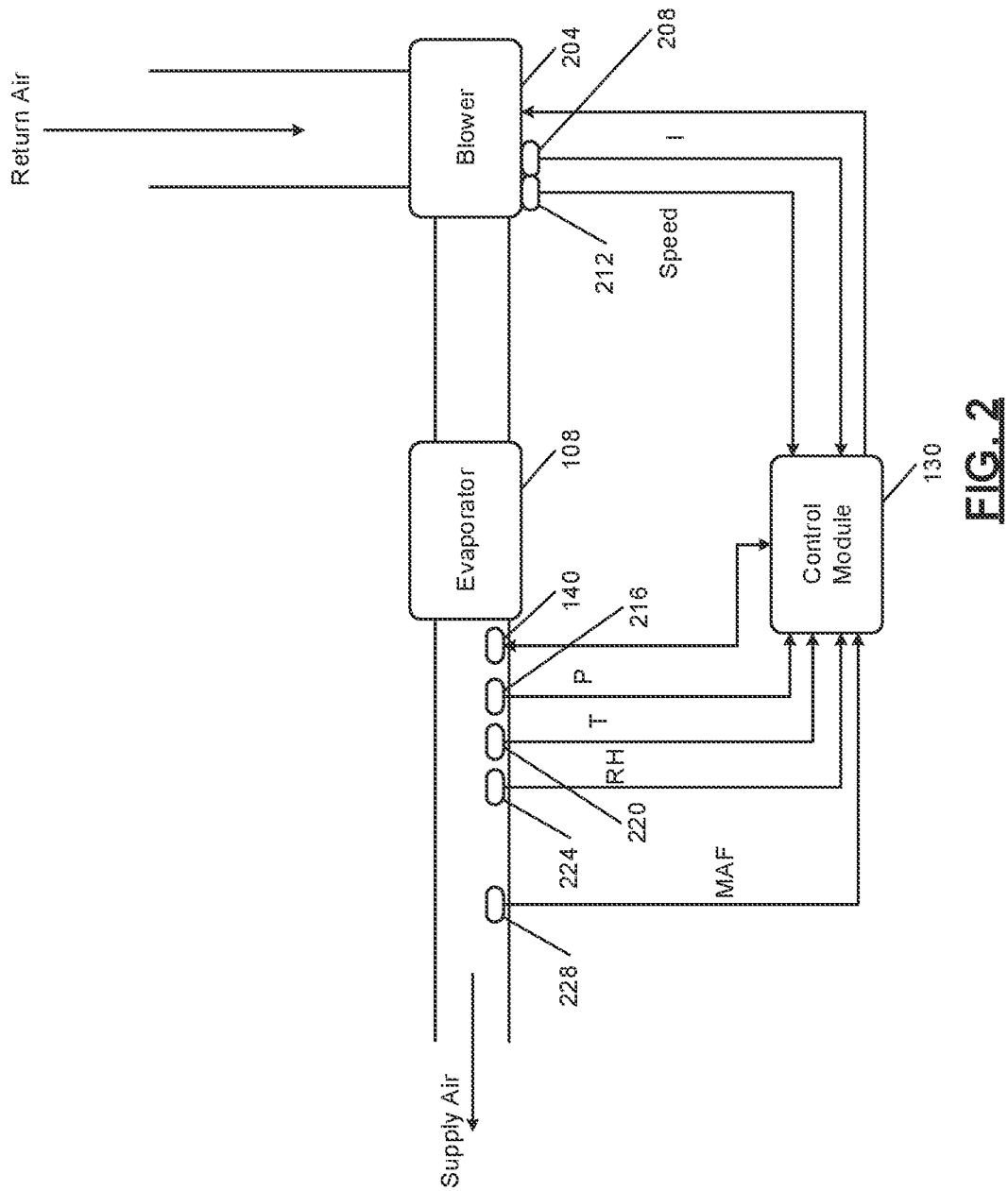
FIG. 2 is a functional block diagram of an example portion of the refrigeration system of FIG. 1.

FIG. 2 is a functional block diagram of an example portion of the refrigeration system of FIG. 1. When on, a blower 204 draws air in from within the building through one or more return air ducts. The blower 204 forces air past the evaporator 108. The evaporator 108 transfers heat to or from the air as the air passes the evaporator 108. Heated or cooled air flows from the evaporator 108 to within the building through one or more supply air ducts.

One or more sensors may be implemented in addition to the refrigerant leak sensor 140. For example, a motor current sensor 208 may measure current to the blower 204 and more specifically to an electric motor of the blower 204. The control module 130 may determine that the blower 204 is on (and turn off the refrigerant leak sensor 140) when the current is greater than a predetermined current.

Additionally or alternatively, a voltage sensor may measure a voltage applied to the electric motor of the blower 204. The control module 130 may determine that the blower 204 is on (and turn off the refrigerant leak sensor 140) when the voltage is greater than a predetermined voltage.

Additionally or alternatively, a power sensor may measure a power consumption of the electric motor of the blower 204. The control module 130 may determine that the blower 204 is on (and turn off the refrigerant leak sensor 140) when the power consumption is greater than a predetermined power.

Additionally or alternatively, a speed sensor 212 may measure a rotational speed of the electric motor of the blower 204. The control module 130 may determine that the blower 204 is on (and turn off the refrigerant leak sensor 140) when the speed is greater than a predetermined speed.

Additionally or alternatively, one or more sensors may be implemented downstream of the evaporator 108. For example, a pressure sensor 216 may measure a pressure of air downstream of the evaporator 108 (e.g., in a supply air duct). The control module 130 may determine that the blower 204 is on (and turn off the refrigerant leak sensor 140) when the pressure is greater than a predetermined pressure (e.g., a barometric pressure). The pressure may approach barometric pressure when the blower 204 is off. The pressure may increase relative to barometric pressure when the blower 204 is on.

Additionally or alternatively, a temperature sensor 220 may measure a temperature of air downstream of the evaporator 108 (e.g., in a supply air duct). The control module 130 may determine that the blower 204 is on (and turn off the refrigerant leak sensor 140) when the temperature is greater than a predetermined temperature (e.g., a setpoint temperature of the thermostat) during heating or less than the predetermined temperature during cooling. The temperature measured by the temperature sensor 220 may be an ambient temperature while the blower 204 is off.

Additionally or alternatively, a relative humidity sensor 224 may measure a relative humidity (RH) of air downstream of the evaporator 108 (e.g., in a supply air duct). The control module 130 may determine that the blower 204 is on (and turn off the refrigerant leak sensor 140) when the relative humidity is greater than or less than a predetermined relative humidity. Different predetermined relative humidities may be used for heating mode and cooling mode. The relative humidity measured by the relative humidity sensor 224 may be an ambient relative humidity while the blower 204 is off.

Additionally or alternatively, an air flowrate (e.g., mass air flowrate (MAF)) sensor 228 may measure a flowrate (e.g., a mass flowrate) of air downstream of the evaporator 108 (e.g., in a supply air duct). The control module 130 may determine that the blower 204 is on (and turn off the refrigerant leak sensor 140) when the air flowrate is greater than a predetermined air flowrate.

While example locations of sensors are provided in FIG. 2, the sensors may be located in other suitable locations. Additionally, one or more of the sensors of FIG. 2 may be omitted or duplicated.

Figure 3:
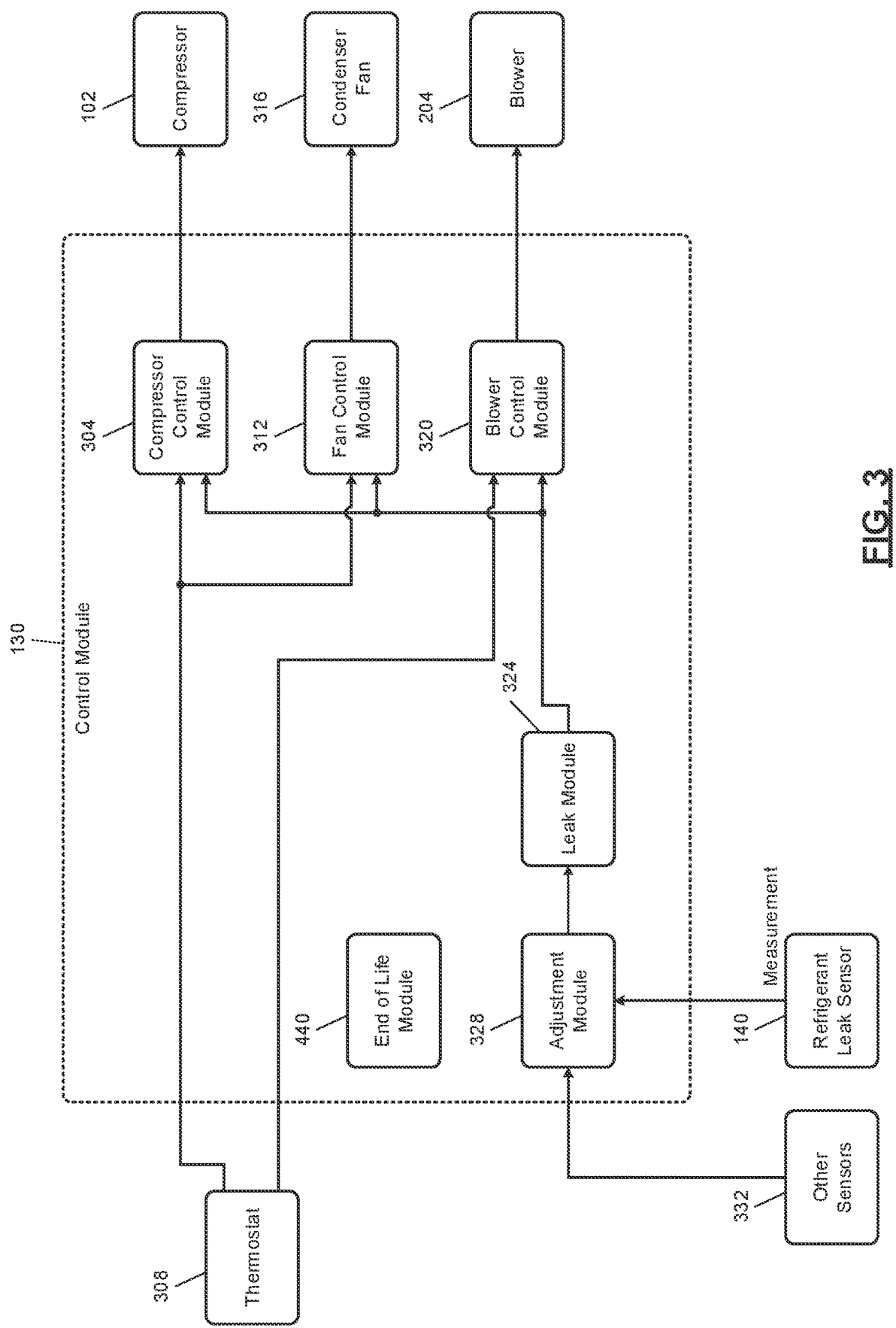
FIG. 3 is a functional block diagrams of example implementations of a control module.

FIG. 3 is a functional block diagram of an example implementation of the control module 130. A compressor control module 304 controls operation of the compressor 102. For example, the compressor control module 304 may turn on the compressor 102 in response to receipt of a command (e.g., cool mode command) from a thermostat 308. The thermostat 308 may generate the command, for example, when a temperature of air within the building is greater than a setpoint temperature (in the example of cooling) or less than the setpoint temperature (in the example of heating). The compressor control module 304 may vary a speed and/or capacity of the compressor 102 when the compressor 102 is on. The compressor control module 304 may turn the compressor 102 off when the thermostat 308 stops generating the command.

A fan control module 312 controls operation of the condenser fan 316. The condenser fan 316 increases airflow past the condenser 104 when the condenser fan 316 is on. For example, the fan control module 312 may turn on the condenser fan 316 in response to receipt of the command from the thermostat 308. The fan control module 312 may turn the condenser fan 316 off when the thermostat 308 stops generating the command. In various implementations, the fan control module 312 may turn the condenser fan 316 on before the compressor 102 is turned on and maintain the condenser fan 316 on for a predetermined period after the compressor 102 is turned off.

A blower control module 320 controls operation of the blower 204. For example, the blower control module 320 may turn on the blower 204 in response to receipt of the command from the thermostat 308. The blower control module 320 may also turn on the blower 204 in response to receipt of a command for heating from the thermostat 308. The blower control module 320 may also turn on the blower 204 in response to receipt of a command to turn the blower 204 on (Fan On command) from the thermostat 308. The blower control module 320 may turn the blower 204 off when the thermostat 308 is not generating any of the commands. In various implementations, the blower control module 320 may turn the blower 204 on before the compressor 102 is turned on and maintain the blower 204 on for a predetermined period after the compressor 102 is turned off.

The control modules discussed herein turn a device on by applying power to the device. The control modules turn a device off by disconnecting the device from power.

The blower control module 320 may also turn the blower 204 on when a refrigerant leak is detected using the refrigerant leak sensor 140. For example, a leak module 324 may determine that a refrigerant leak is present in the refrigeration system when the amount of refrigerant measured outside of the refrigeration system by the refrigerant leak sensor 140 is greater than a predetermined amount. The leak module 324 may determine that a refrigerant leak is not present when the amount is less than the predetermined amount.

One or more other remedial actions may be taken when a refrigerant leak is present in the refrigeration system, such as described above. For example, the compressor control module 304 may turn the compressor 102 off and maintain the compressor 102 off for a predetermined period when a refrigerant leak is present. One or more isolation valves may also be closed, such as to pump refrigerant out from within the building and to trap the refrigerant outside of the building.

As discussed above, the amount of refrigerant measured by the refrigerant leak sensor 140 may vary from the actual amount of refrigerant present at the refrigerant leak sensor 140. An adjustment module 328 may adjust the amount of refrigerant measured by the refrigerant leak sensor before the (adjusted) amount of refrigerant is used, such as by the leak module 324. The adjustment module 328 may determine one or more adjustments based on measurements from one or more other sensors 332, such as the temperature sensor 220, the relative humidity sensor 224, the pressure sensor 216, and/or one or more other types of sensors. While the adjustment module 328 is illustrated as being implemented within the control module 130, the adjustment module 328 may be implemented within the refrigerant leak sensor 140 or a portion of the functionality of the adjustment module 328 may be implemented within the refrigerant leak sensor 140 and a portion (e.g., the remainder) of the functionality of the adjustment module 328 may be implemented within the control module 130.

Figure 4:
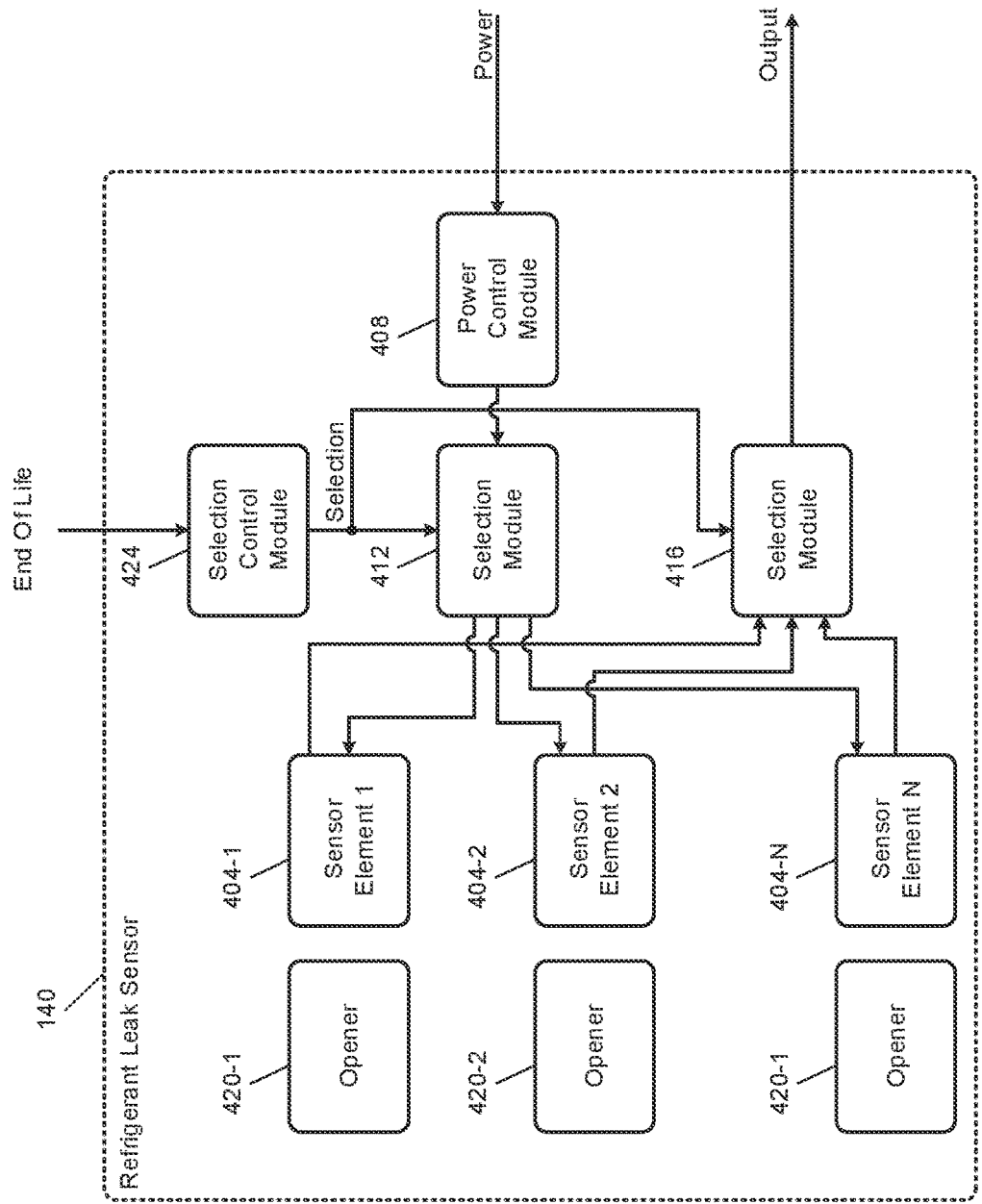
FIG. 4 is a functional block diagram of an example refrigerant leak sensor.

FIG. 4 is a functional block diagram of an example implementation of the refrigerant leak sensor 140. The refrigerant leak sensor 140 includes N refrigerant sensor elements 404-1, 404-2, 404-N (collectively "refrigerant sensor elements 404"). N is an integer greater than one and may be two, three, four, or more than four.

When powered, the refrigerant sensor elements 404 measure an amount of refrigerant present at the refrigerant sensor elements 404. The refrigerant sensor elements 404 may be, for example, non-dispersive infrared (NDIR) refrigerant sensors, optical refrigerant sensors, thermal conductivity refrigerant sensors, quartz crystal microbalance (QCM) refrigerant sensors, electrochemical refrigerant sensors, catalytic bead refrigerant sensors, or another suitable type of refrigerant leak sensor. NDIR refrigerant sensors include an infrared (IR) lamp that transmits light through a tube. A fan or blower may push or pull gas (e.g., air and, if a leak is present, refrigerant) through the tube. An optical sensor receives light from the IR lamp through the tube and measures the amount of refrigerant in the gas based on one or more characteristics of the light. A thermal conductivity sensor includes conductive plates between which the gas may be pushed or pulled by a blower or a fan. The blower or fan may be omitted in various implementations. Different amounts of refrigerant have different thermal conductivities. Thermal conductivity sensors include two temperature sensors (e.g., one before and one after a heating element). A thermal conductivity sensor determines a temperature difference between the measurements from the two sensors. Given a known heating input from the heating element, the thermal conductivity sensor determines the amount of the refrigerant based on the temperature difference. Different amounts of refrigerant have different densities and may therefore cause different vibrations. QCM sensors measure the amount of refrigerant in the gas based on the vibration. Other examples of the refrigerant sensor elements 404 include metal oxide refrigerant sensors, acoustic refrigerant sensors, quartz resonation (e.g., QCM) refrigerant sensors, and carbon nanotube refrigerant sensors. Metal oxide refrigerant sensors measure a resistance across a surface oxidizer heated by a hotplate. In the presence of the refrigerant, the resistance of the oxidizing layer may decrease. As refrigerant dissipates, the resistance of the oxidizing layer may increase. A metal oxide refrigerant sensor may determine the amount of refrigerant based on the resistance. Metal oxide refrigerant sensors may be less costly than other types of refrigerant sensors.

As discussed further below, only one of the refrigerant sensor elements 404 is powered and used to measure the amount of refrigerant at a time. For example, first, the sensor element 404-1 may be powered and used to measure the amount of refrigerant. When the first refrigerant sensor element 404-1 is at or near the end of its useful life, the first refrigerant sensor element 404-1 may be disconnected from power, and the refrigerant sensor element 404-2 may be powered and used to measure the amount of refrigerant. This process may continue until the last of the refrigerant sensor elements 404 is at or near the end of its useful life.

A power control module 408 receives power, such as 120 Volt AC power from a utility, and outputs power (e.g., DC power) for the refrigerant sensor elements 404 based on the received power. In various implementations, the power control module 408 may boost or buck the input power to generate the output power. In various implementations, the power control module 408 may perform AC to DC conversion or DC to AC conversion.

A selection module 412 selects which one of the refrigerant sensor elements 404 to output power to based on the state of a selection signal. For example, the selection module 412 may output power to the refrigerant sensor element 404-1 when the selection signal is in a first state, output power to the refrigerant sensor element 404-2 when the selection signal is in a second state, . . . , and output power to the refrigerant sensor element 404-N when the selection signal is in an N-th state. The selection module 412 may be a 1 to N demultiplexer or another suitable type of selection device.

A selection module 416 selects which one of the refrigerant sensor elements 404 to connect to the output signal that is transmitted to the control module 130. Generally speaking, the selection module 416 connects the one of the refrigerant sensor elements 404 that is powered to the output signal. For example, the selection module 416 may connect the output of the refrigerant sensor element 404-1 to the output signal when the selection signal is in the first state, connect the output of the refrigerant sensor element 404-2 to the output signal when the selection signal is in the second state, . . . , and connect the output of the refrigerant sensor element 404-N to the output signal when the selection signal is in the N-th state. The selection module 412 may be an N to 1 multiplexer or another suitable type of selection device.

Figure 5:
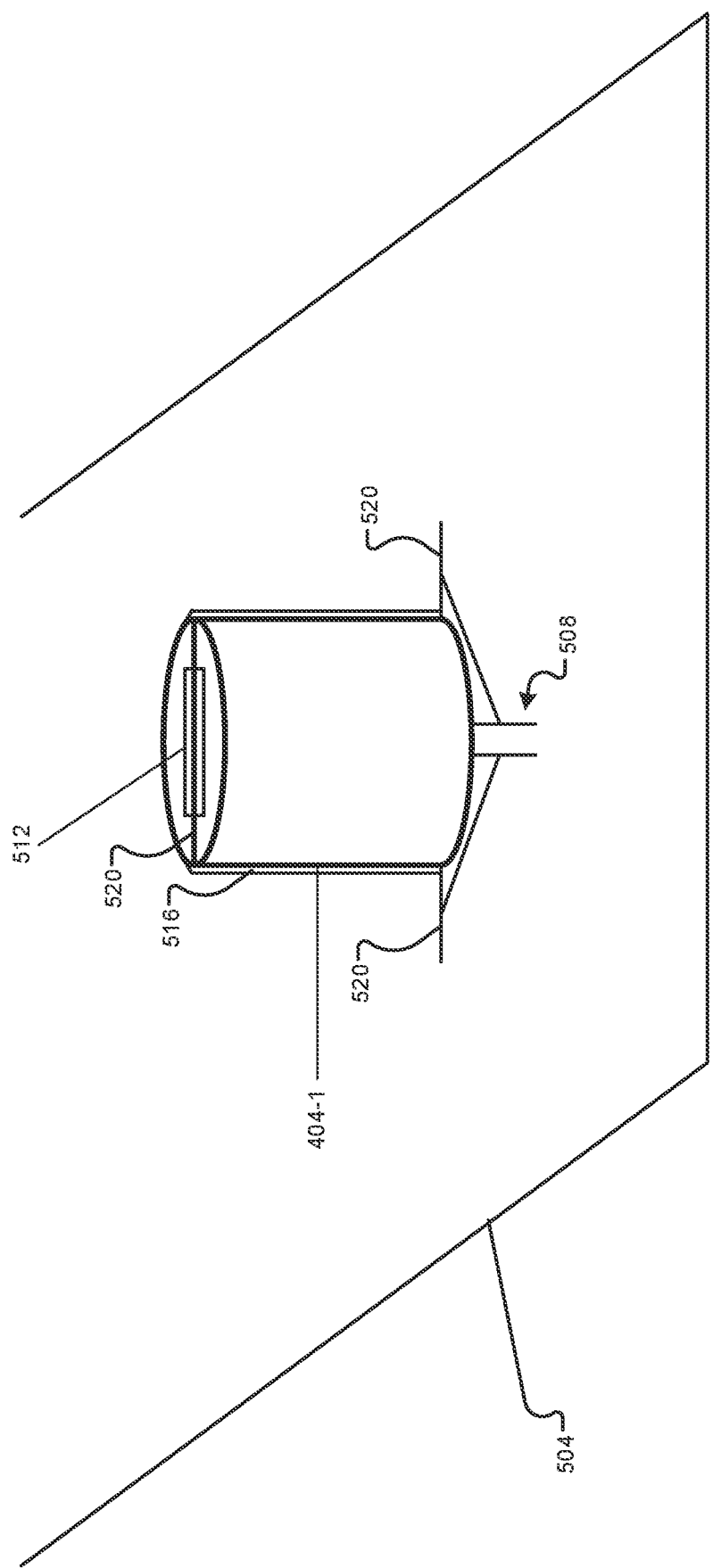
FIGS. 5 and 6 are perspective views of an example portion of the refrigerant leak sensor.

FIG. 5 includes a perspective view of an example portion of the refrigerant leak sensor 140 including the refrigerant sensor element 404-1. The refrigerant sensor elements 404 may be similar or identical. While the example of a cylindrical refrigerant sensor is provided, the present application is applicable to refrigerant sensors of other shapes.

The components of FIG. 4 including the refrigerant sensor elements 404 may be implemented on a circuit board 504, such as a printed circuit board, or another suitable type of substrate. Power may be received by the refrigerant sensor elements 404 via the circuit board 504 (e.g., traces) via electrical conductors 508 of the refrigerant sensor elements 404.

Each of the refrigerant sensor elements 404 may include an opening through which the amount of refrigerant is measured. For example, the sensor element 404-1 is illustrated with an opening 512. Each of the refrigerant sensor elements 404 (specifically the opening) may be covered by an impermeable film prior to power being applied to that sensor element 404. For example, the sensor element 404-1 is illustrated with an impermeable film 516 in FIG. 5 that covers the opening 512. The film 516 may be, for example, a polyvinyl chloride film, a low-density polyethelene film, an ethylene vinyl acetate copolymer film, a polyactic acid film, a polyhydroxyburyrate film, a poly(3-hydroxybutyrate-co-3-hydroxyvalerate) film, or another suitable type of film. The film may have a uniform thickness or varying thickness (e.g., thicker or thinner over the opening). The film may be fixed or applied to the refrigerant sensor elements 404 using, for example, mechanical crimping, adhesive, ultrasonic welding, spraying, deposition (e.g., plasma), or in another suitable manner. The film hermitically seals the refrigerant sensor elements 404 (e.g., the openings) prior to the refrigerant sensor elements 404 being powered, respectively. The film is impermeable to air and other items (e.g., particulate, carbon monoxide, volatile organic compounds (VOCS), water vapor, refrigerants, oils, etc.).

As shown in FIG. 4, each of the refrigerant sensor elements 404 may have an associated opener 420-1, 420-2, . . . , 420-N (collectively "openers 420"). In various implementations, one or more (e.g., a first one of the refrigerant sensor elements 404 to be powered) may not have a film and not have an associated opener. The openers 420 are configured to open the openings of the refrigerant sensor elements 404 when the refrigerant sensor elements 404 are powered, respectively. Once open, the refrigerant sensor elements 404 can measure the amount of refrigerant present.

Figure 6:
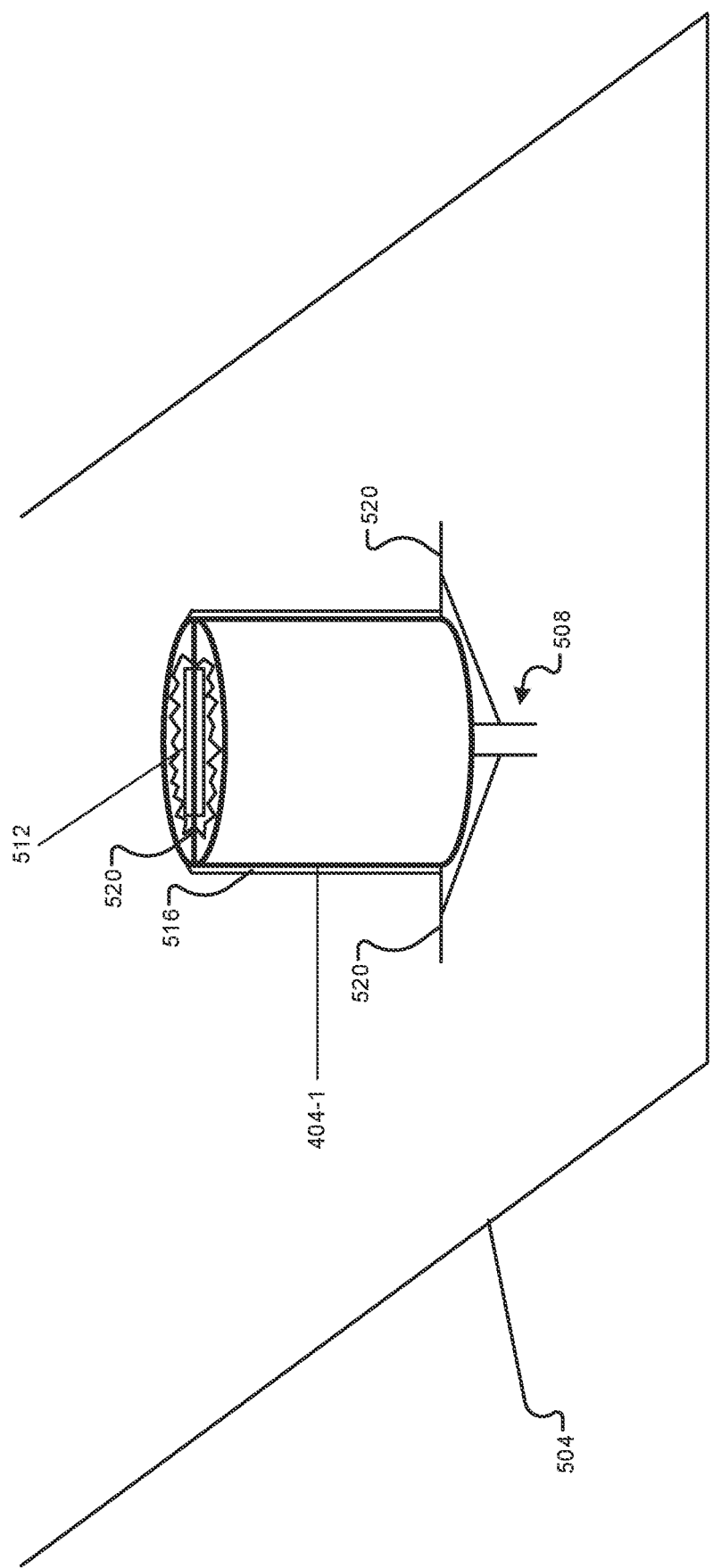

One example opener is illustrated in the example of FIG. 5 as an electric resistive heater 520, such as an electrically conductive wire. Examples of the resistive heater 520 (or more generally referred to as a heat source) include, for example, a nichrome wire, a copper wire, an aluminum wire, or another suitable resistance heating alloy or material, micro hotplates, and ceramic infrared heaters. A gauge of the wire may be selected based on manufacturability, a heating current to open the film, and/or one or more other considerations. The gauge of the wire may be, for example, 30-40 AWG, 36 AWG, or another suitable gauge. The resistive heaters may be connected to the connectors used to power the refrigerant sensor elements 404 such that the resistive heater is turned on when the sensor element 404 is powered. The resistive heater melts, burns, or otherwise opens the opening. FIG. 6 includes an example perspective view with the opening opened via the resistive heater 520. In various implementations, the refrigerant sensor elements 404 may include a capacitor bank, a battery, a voltage converter, or another suitable device configured to apply power to the resistive heaters. The application of power to the resistive heater may gradually open the film, approximately instantaneous, or instantaneous. For example, an approximately instantaneous or instantaneous application of 1 Watt of power to the resistive heater may rupture a 12.7 micrometer (μm) thick low-density polyethylene film. A thickness of the film may be, for example, 30 μm or less, 20 μm or less, 15 μm or less, 10 μm or less, or another suitable thickness.

Other examples of openers include infrared light (IR) or ultraviolet (UV) configured to output IR or UV light to the refrigerant sensor elements, respectively, to remove (e.g., degrade) the film, dissolving the film chemically or biodegradably, mechanically rupturing or removing the film, such as by scraping or puncturing, etc. Ethylene vinyl acetate copolymer and polyactic acid may be heat and mechanically openable films. Polyactic acid films may be removed via UV light. Polyhydroxyburyrate film and a poly(3-hydroxybutyrate-co-3-hydroxyvalerate) film may be biodegradable.

A selection control module 424 generates the selection signal. The selection control module 424 sets the state of the selection signal in a predetermined order. For example, the selection control module 424 may set the selection signal to the first state when the refrigerant leak sensor 140 is first powered on. This powers the sensor element 404-1, opens the film on the sensor element 404-1, and connects the output of the sensor element 404-1 to the output signal.

When an end of life module 440 (see FIG. 3) indicates that the sensor element 404-1 is at or near an end of its useful life (or a first time that the end of life module 440 generates the end of life signal), the selection control module 424 may transition the selection signal to the second state. This powers the sensor element 404-2, opens the film on the sensor element 404-2, and connects the output of the sensor element 404-2 to the output signal. This also disconnects the sensor element 404-1 from power and disconnects the output of the sensor element 404-1 from the output signal. While the example of the end of life module being within the control module 130 is provided, the end of life module 440 may alternatively be part of the refrigerant leak sensor 140.

When the end of life module 440 indicates that the sensor element 404-2 is at or near an end of its useful life (or a second time that the end of life module 440 generates the end of life signal), the selection control module 424 may transition the selection signal to a third state. This powers a third one of the refrigerant sensor elements 404, opens the film on the third one of the refrigerant sensor elements 404, and connects the output of the third one of the refrigerant sensor elements 404 to the output signal. This also disconnects the sensor element 404-2 from power and disconnects the output of the sensor element 404-2 from the output signal. This continues until the refrigerant sensor element 404-N is at or near the end of its useful life.

The end of life module 440 may indicate (via generating the end of life signal) whether the presently powered sensor element 404 of the refrigerant leak sensor 140 is at or nearing an end of its useful life. Each sensing elements of the refrigerant leak sensor 140 may have an accuracy that is less than a predetermined value when that sensing element is at or nearing the end of its useful life. A different sensing element of the refrigerant leak sensor 140 should be used when that sensing element is at or nearing the end of its useful life.

The end of life module 440 may determine that a sensing element is at or near the end of its useful life, for example, when that sensing element has been used (e.g., powered) for at least a predetermined period. Additionally or alternatively, the end of life module 440 may determine that a sensing element is at or near the end of its useful life when a change in the measurements of that sensing element (e.g., the output signal) in response to a change in relative humidity is greater than or less than a predetermined expected value bounds associated with the change in relative humidity. Additionally or alternatively, the end of life module 440 may determine that a sensing element is at or near the end of its useful life when a change in the measurements in response to a change in temperature is greater than or less than a predetermined expected value bounds associated with the change in temperature. The end of life module 440 may determine that a sensing element is at or near the end of its useful life when a change in the measurements in response to a change in pressure is less than a predetermined expected value associated with the change in pressure.

The end of life module 440 may take one or more remedial actions when all of the N sensing elements 404 of the refrigerant leak sensor 140 are at or near the end of their useful lives. At this time, the refrigerant leak sensor 140 may be at or near the end of its useful life. For example, the end of life module 440 may illuminate a light, store a predetermined code in memory, transmit a message to one or more computing devices via a network, or perform one or more other remedial actions when the refrigerant leak sensor 140 is at or near the end of its useful life.

Figure 7:
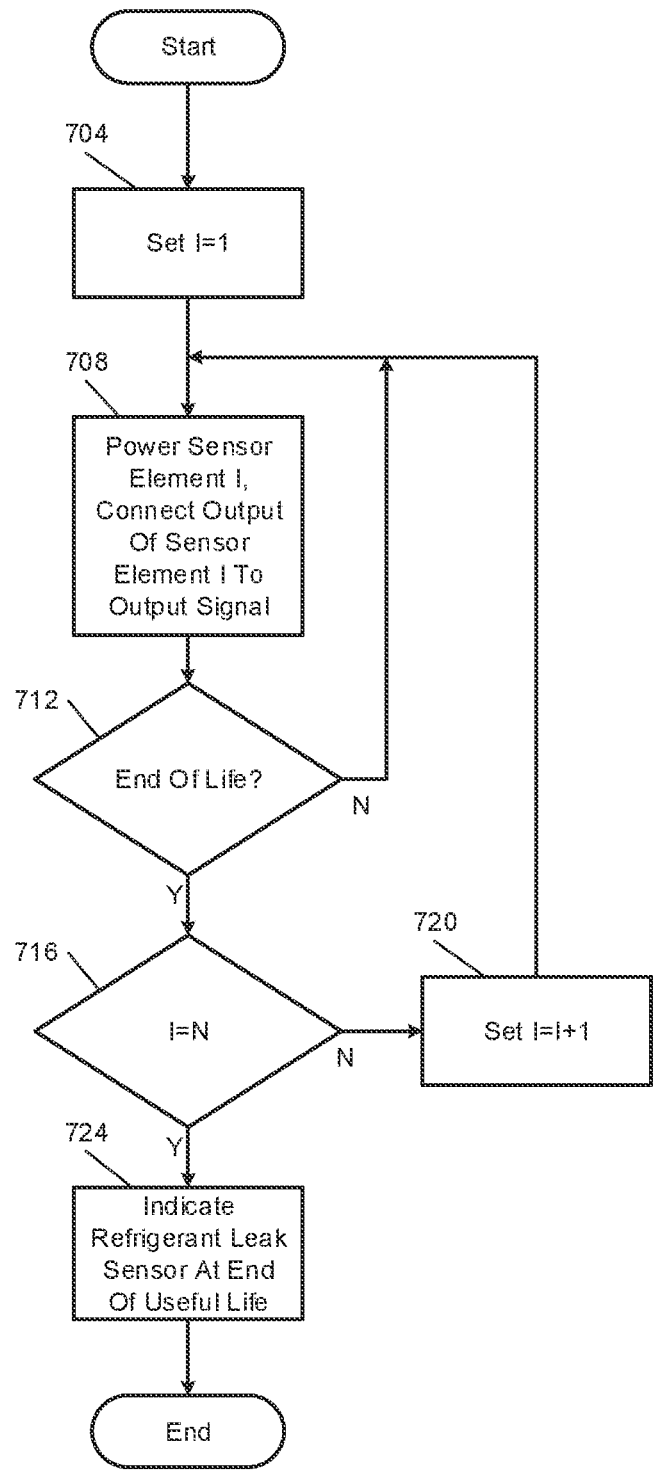
FIG. 7 is a flowchart depicting an example method of controlling operation of the refrigerant leak sensor.

FIG. 7 is a flowchart depicting an example method of controlling operation of the refrigerant leak sensor 140. Control begins with 704 where the selection control module 424 sets an integer I to 1. The selection control module 424 sets the selection signal to the I-th state. For example, when I=1, the selection control module 424 sets the selection signal to the first state. When I=2, the selection control module 424 sets the selection signal to the second state, etc.

At 708, the selection module 412 connects the I-th one of the refrigerant sensor elements 404 to power based on the state of the selection signal. Also, the selection module 416 connects the output of the I-th one of the refrigerant sensor elements 404 to the output signal based on the state of the selection signal.

At 712, the end of life module 440 determines whether the I-th one of the refrigerant sensor elements 404 is at or near the end of its useful life. If 712 is false, control returns to 708 to continue powering and using the measurements of the I-th one of the refrigerant sensor elements 404. If 712 is true, control continues with 716.

At 716, the selection control module 424 determines whether the integer I is equal to N (the total number of the refrigerant sensor elements 404). If 716 is false, the selection control module 424 may increment I by 1 at 720 (e.g., set I=I+1) and return to 708 to begin applying power to the next one of the refrigerant sensor elements 404, open the next sensor element, and begin using the output of the next one of the refrigerant sensor elements 404. If 716 is true, the end of life module 440 may indicate that the refrigerant leak sensor 140 is at or near the end of its useful life. One or more other remedial actions may be taken at 724.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A refrigerant leak sensor, comprising:
   a first refrigerant sensor element configured to, when powered:
      measure a first amount of the refrigerant present in air; and
      generate a first output based on the first amount;
   a second refrigerant sensor element configured to, when powered:
      measure a second amount of the refrigerant present in air; and
      generate a second output based on the second amount;
   a first selection module configured to:
      during a first period, apply power the first refrigerant sensor element and not apply power to the second refrigerant sensor element; and
      during a second period after the first period, apply power to the second refrigerant sensor element and not apply power to the first refrigerant sensor element; and
   a second selection module configured to:
      during the first period, connect the first output of the first refrigerant sensor element to a third output and not connect the second output of the second refrigerant sensor element to the third output; and
      during the second period, connect the second output of the second refrigerant sensor element to the third output and not connect the first output of the first refrigerant sensor element to the third output.

2. A refrigerant leak system comprising:
   the refrigerant leak sensor of claim 1; and
   a leak module configured to indicate whether a refrigerant leak is present based on the third output.

3. The refrigerant leak sensor of claim 1 wherein the second refrigerant sensor element is covered with an air impermeable film prior to being powered.

4. The refrigerant leak sensor of claim 3 further comprising an opener configured to open at least a portion of the film covering an opening of the second refrigerant sensor element.

5. The refrigerant leak sensor of claim 4 wherein the opener is a heat source.

6. The refrigerant leak sensor of claim 5 wherein the heat source generates heat and ruptures the film when power is applied to the second refrigerant sensor element.

7. The refrigerant leak sensor of claim 4 wherein the opener is a light source.

8. The refrigerant leak sensor of claim 7 wherein the light source is configured to output light onto the film and rupture the film when power is applied to the second refrigerant sensor element.

9. The refrigerant leak sensor of claim 8 wherein the light source is configured to output one of infrared (IR) and ultraviolet (UV) light onto the film.

10. The refrigerant leak sensor of claim 3 wherein the film includes one of a polyvinyl chloride film, a low density polyethylene film, an ethylene vinyl acetate copolymer film, a polyactic acid film, a polyhydroxyburyrate film, and a poly(3-hydroxybutyrate-co-3-hydroxyvalerate) film.

11. The refrigerant leak sensor of claim 3 wherein a thickness of the film is less than or equal to 30 micrometers.

12. The refrigerant leak sensor of claim 1 further comprising a third refrigerant sensor element configured to, when powered:
   measure a third amount of the refrigerant present in air; and
   generate a fourth output based on the third amount,
   wherein the first selection module is further configured to, during a third period after the second period, apply power to the third refrigerant sensor element and not apply power to the first and second refrigerant sensor elements, and
   wherein the second selection module is configured to, during the third period, connect the fourth output of the third refrigerant sensor element to the third output and not connect the first and second outputs of the first and second refrigerant sensor elements to the third output.

13. The refrigerant leak sensor of claim 1 wherein the refrigerant leak sensor is located within a duct of a heating ventilation and air conditioning (HVAC) system of a building.

14. The refrigerant leak sensor of claim 1 wherein the refrigerant is classified as at least mildly flammable.

15. The refrigerant leak sensor of claim 1 wherein the first and second refrigerant sensor elements are one of:
   non-dispersive infrared (NDIR) refrigerant sensors;
   optical refrigerant sensors;
   thermal conductivity refrigerant sensors;
   quartz crystal microbalance (QCM) refrigerant sensors;
   electrochemical refrigerant sensors;
   catalytic bead refrigerant sensors; and
   metal oxide refrigerant sensors.

16. A refrigerant leak system, comprising:
   the refrigerant leak sensor of claim 1;
   an end of life module configured to indicate when an end of life event of the first refrigerant sensor element has occurred; and
   a selection control module configured to end the first period and begin the second period in response to the indication that the end of life event of the first refrigerant sensor element has occurred.

17. The refrigerant leak system of claim 16 wherein the end of life module is configured to indicate that the end of life event of the first refrigerant sensor element has occurred when the first refrigerant sensor element has been powered for a predetermined period.

18. The refrigerant leak system of claim 16 wherein the end of life module is configured to indicate that the end of life event of the first refrigerant sensor element has occurred when a change in the first output over time is greater than a predetermined period.

19. The refrigerant leak system of claim 16 wherein the end of life module is configured to indicate that the end of life event of the first refrigerant sensor element has occurred when a change in the first output in response to a change in an operating parameter is less than a predetermined period.

20. A method of sensing refrigerant leaks, comprising:
by a first refrigerant sensor element, when powered:
measuring a first amount of the refrigerant present in air; and
generating a first output based on the first amount;
by a second refrigerant sensor element, when powered:
measuring a second amount of the refrigerant present in air; and
generating a second output based on the second amount;
during a first period, applying power the first refrigerant sensor element and not applying power to the second refrigerant sensor element;
during a second period after the first period, applying power to the second refrigerant sensor element and not applying power to the first refrigerant sensor element;
during the first period, connecting the first output of the first refrigerant sensor element to a third output and not connecting the second output of the second refrigerant sensor element to the third output; and
during the second period, connecting the second output of the second refrigerant sensor element to the third output and not connecting the first output of the first refrigerant sensor element to the third output.

* * * * *